US011773929B2

(12) United States Patent
Kuemmerling et al.

(10) Patent No.: US 11,773,929 B2
(45) Date of Patent: *Oct. 3, 2023

(54) BRAKE DUST PARTICLE FILTER AND DISC BRAKE ASSEMBLY HAVING A BRAKE DUST PARTICLE FILTER

(71) Applicant: MANN+HUMMEL GmbH, Ludwigsburg (DE)

(72) Inventors: Volker Kuemmerling, Bietigheim-Bissingen (DE); Thomas Jessberger, Asperg (DE); Lukas Bock, Bietigheim-Bissingen (DE); Coskun Evlekli, Waiblingen (DE); Eric Thébault, Ludwigsburg (DE); Jan Corba, Chamerau (DE); Benedikt Weller, Steinheim (DE); Andreas Beck, Kirchheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 398 days.

This patent is subject to a terminal disclaimer.

(21) Appl. No.: 17/100,419

(22) Filed: Nov. 20, 2020

(65) Prior Publication Data

US 2021/0140497 A1 May 13, 2021

Related U.S. Application Data

(63) Continuation of application No. PCT/EP2019/055790, filed on Mar. 7, 2019.

(30) Foreign Application Priority Data

May 22, 2018 (DE) .......................... 102018112261.6

(51) Int. Cl.
*F16D 65/00* (2006.01)
*F16D 55/22* (2006.01)

(52) U.S. Cl.
CPC ......... *F16D 65/0031* (2013.01); *F16D 55/22* (2013.01)

(58) Field of Classification Search
CPC .... F16D 65/0031; F16D 55/22; F16D 55/225; F16D 2065/1392; F16D 65/02;
(Continued)

(56) References Cited

U.S. PATENT DOCUMENTS

| 5,035,304 A | * | 7/1991 | Bosch | ................. F16D 65/0031 |
| | | | | 188/73.31 |
| 7,594,567 B2 | * | 9/2009 | Sabelstrom | ........... B60B 7/0086 |
| | | | | 188/71.6 |

(Continued)

FOREIGN PATENT DOCUMENTS

| DE | 102009021203 A1 | 1/2010 |
| DE | 102010053879 A1 | 6/2012 |

OTHER PUBLICATIONS

WO 2005091838 A2 (Year: 2005).*

*Primary Examiner* — Robert A. Siconolfi
*Assistant Examiner* — Mahbubur Rashid (57) ABSTRACT

A brake dust particle filter for a disc brake assembly is provided to catch particles generated during braking. The brake dust particle filter has a ring segment-shaped housing with two axially spaced apart housing side walls and a radially outwardly positioned housing peripheral wall. The housing peripheral wall is arranged between the housing side walls. The housing accommodates the brake disc in the housing interior. A tongue projects inwardly away from the housing peripheral wall in the housing interior. The tongue projects at least in sections with a radial component and has a flat cross section with a base surface facing the housing peripheral wall, an end face projecting into the housing interior, and a side face. The tongue is formed by a filter medium and has no supporting device components separate (Continued)

from the filter medium. The filter medium provides a satisfactory stiffness keeping the tongue structurally stiff.

28 Claims, 8 Drawing Sheets

(58) Field of Classification Search
CPC ....... F16D 2055/0037; F16D 2055/005; B01D 46/0046; B01D 46/0002; B01D 46/106
See application file for complete search history.

(56) References Cited

U.S. PATENT DOCUMENTS

| | | | |
|---|---|---|---|
| 8,191,691 B2* | 6/2012 | Gelb | F16D 65/0031 |
| | | | 188/71.6 |
| 8,701,844 B2* | 4/2014 | Tsiberidis | F16D 65/847 |
| | | | 188/264 AA |
| 9,291,221 B2* | 3/2016 | Hummel | F16D 65/0031 |
| 9,291,222 B2* | 3/2016 | Hummel | F16D 65/0031 |
| 2008/0029357 A1 | 2/2008 | Krantz | |
| 2010/0065387 A1* | 3/2010 | Tsiberidis | F16D 65/0031 |
| | | | 188/218 A |
| 2014/0054119 A1 | 2/2014 | Hummel et al. | |
| 2014/0054121 A1 | 2/2014 | Hummel et al. | |
| 2015/0096848 A1* | 4/2015 | Lupica | F16D 65/092 |
| | | | 188/73.1 |
| 2016/0215833 A1* | 7/2016 | Robert | H10N 10/17 |

* cited by examiner

BRAKE DUST PARTICLE FILTER AND DISC BRAKE ASSEMBLY HAVING A BRAKE DUST PARTICLE FILTER

CROSS-REFERENCE TO RELATED APPLICATIONS

This application is a continuation application of international application No. PCT/EP2019/055790 having an international filing date of 7 Mar. 2019 and designating the United States, the international application claiming a priority date of 22 May 2018 based on prior filed German patent application No. 10 2018 112 261.6, the entire contents of the aforesaid international application and the aforesaid German patent application being incorporated herein by reference.

BACKGROUND OF THE INVENTION

The invention concerns a brake dust filter for a disc brake assembly with a disc brake and a brake caliper. The brake dust particle filter is embodied for catching particles generated during braking. The invention concerns moreover a disc brake assembly with such a brake dust particle filter.

It is known to catch and dispose of particles that are generated by abrasion during braking with a brake dust particle filter. Such particles are generated by friction between brake pad and brake disc of a disc brake. Such a brake dust particle filter is disclosed, for example, in DE 10 2012 016 835 A1. This brake dust particle filter concerns however an integration in a brake caliper housing and is suitable only within limits as a retrofitting solution.

SUMMARY OF THE INVENTION

In contrast thereto, it is object of the present invention to provide a brake dust particle filter that is embodied to more efficiently separate particles that are generated during braking and is suitable for retrofitting existing vehicles. Object of the present invention is moreover to provide a disc brake assembly with such a brake dust particle filter.

The brake dust particle filter according to the invention is suitable for arbitrary applications of disc brakes, mobile as well as stationary applications. In case of mobile applications, it can be used, for example, in passenger cars, trucks, buses, rail vehicles. Stationary, for example, for shaft brakes as they are used in wind energy devices.

This object is solved by a brake dust particle filter for a disc brake assembly with a brake disc and a brake caliper, wherein the brake dust particle filter is embodied for catching particles generated during braking and wherein the brake dust particle filter includes the following:

- a ring segment-shaped housing for at least partial accommodation of the brake disc in a housing interior, wherein the housing includes two axially spaced apart housing side walls and a housing peripheral wall extending radially outwardly in peripheral direction and wherein the housing peripheral wall is arranged or embodied between the housing side walls;
- at least one tongue projecting at least in sections with at least one radial component in the housing interior inwardly away from the housing peripheral wall;
- wherein the tongue has a flat cross section shape and includes at least one base surface facing the housing peripheral wall, an end face projecting into the housing interior, and at least one side face, and
- at least one filter medium;

wherein the tongue is formed by the filter medium and wherein the tongue includes no supporting device components separate from the filter medium, in particular housing components, and the filter medium provides a satisfactory stiffness in order to keep the tongue structurally stiff in shape.

The object is further solved by a disc brake assembly with a brake disc, a brake caliper, and a brake dust particle filter according to the invention as disclosed above.

The dependent claims provide preferred further embodiments.

The brake dust particle filter includes a ring segment-shaped, approximately banana-shaped and/or helmet-shaped housing. In a mounted state, the brake disc of a disc brake assembly is received in the housing. The housing includes at least two housing side walls and a housing peripheral wall. The housing peripheral wall connects directly or indirectly the two housing side walls in the mounted state of the brake dust particle filter. In the interior of the housing, i.e., facing the brake disc, the brake dust particle filter includes a filter medium. In order to enlarge the effective filter surface of the filter medium, at least one tongue which is formed by the filter medium is provided in the brake dust particle filter. In this way, a greater filtering effect than in the prior art is achieved. The tongue extends in this context preferably from an outer periphery toward an inner periphery, i.e., radially inwardly.

According to the invention, the tongue extends in a housing interior at least in sections with at least one radial component away from the housing peripheral wall. According to the invention, the tongue has a flat cross section shape and includes a base surface facing the housing peripheral wall, an end face which is projecting into the housing interior, and at least one side face. Flat is to be understood herein as a cross section shape whose wide side is much larger than its narrow side. Alternatively, such a cross section shape could also be referred to as platy or elongate. The flat cross section shape in this meaning results moreover from the dimensions of the filter medium that is flat in the unprocessed state and that indeed has a predetermined thickness.

According to the invention, the tongue includes no supporting device components separate from the filter medium, in particular no housing components supporting the tongue. The filter medium provides a sufficient stiffness in order to keep the tongue in itself structurally stiff in shape without supporting device components.

The tongue can extend away from a housing wall, preferably, the tongue extends away from the housing peripheral wall. Alternatively or additionally, the at least one tongue can extend also away from one or both of the housing side walls so that it extends approximately in axial direction. Moreover, the brake dust particle filter can comprise a filter element that includes the filter medium. The filter element can comprise a filter element support structure on or at which the filter medium is fastened and which can serve for attachment of the filter medium in the housing. The filter element support structure can be formed, for example, from a metal screen. When providing a filter element, the filter medium is exchangeable particularly easily and environmentally friendly because upon loading of the filter medium only the filter element must be exchanged and not the complete housing part. According to this embodiment, advantageously a receiving region into which the filter element can be inserted is provided for accommodating the filter element. In the receiving region, it can be held, for example, by clips or other fastening elements that appear suitable. Particularly advantageously, the filter element includes a curved shape, in particular a circular arc shape, that corresponds with the inner shape or the radius of the housing peripheral wall.

In a preferred embodiment, the tongue can have a substantially rectangular cross section wherein a ratio of a wide side to a narrow side of the rectangular cross section lies between 15 and 60, preferably between 20 and 40. Such values can be achieved for a plurality of sizes of the brake dust particle filter with the filter media types described herein.

Particularly preferred, the at least one tongue extends such into the interior that its base surface, in a mounted state of the brake dust particle filter, extends parallel to an axis of rotation of the brake disc.

According to a further preferred embodiment, at least one additional tongue is provided which extends into the housing interior away from at least one housing side wall. Preferably, the tongue extending away from the housing peripheral wall and the tongue extending away from the housing side wall form a continuous tongue which includes an L-shaped or U-shaped basic form. In this way, the effective tongue surface is increased which contributes to an even more improved separation performance. Moreover, a configuration that is space-saving in the radial direction is possible because a portion of the entire tongue surface can be distributed to the tongue that is present at the housing side wall.

According to a further embodiment, the filter medium can comprise a folded structure that forms the tongue, wherein a fold direction includes in particular at least a radial component. Filter media, even high-temperature stable filter media, can be brought into a folded shape without problem by using a machine. Corresponding manufacturing methods for this are known to a person of skill in the art. That the fold direction of the tongue includes a radial component does not mean that it extends precisely radially, but it can extend precisely radially. In one embodiment in which the tongue extends away from one of the housing side walls, the fold direction (fold bottom/fold top) can also extend axially.

According to yet another embodiment, it can be provided that the filter medium that forms the at least one tongue is present in the form of a shape-stiff shaped filter element that has a curved outer contour which corresponds with an inner contour of the housing peripheral wall of the housing. According to this embodiment, the tongue cannot be formed as a folded structure but in the form of a solid material. Suitable porous materials with which such a body can be realized are, for example, sintered metal foams or metal nonwovens, in particular of stainless steel.

In a preferred further embodiment, at a housing wall, in particular at the housing peripheral wall, at least one part of a filter element mounting device can be present, in particular at least one part of a quick mounting device, in particular a part of a clip connection, quick mounting tab and/or a magnetic connecting element. By these means, the aforementioned filter elements in the service situation can be quickly and easily exchanged. Such filter element mounting devices are suitable for the use with filter elements with filter element support structures as well as for filter elements that are embodied as shaped filters. Alternatively, the filter medium, in particular when it includes a metallic filter medium, can also be welded to the housing.

Moreover, the filter element can comprise at least one mounting counter element that corresponds with the filter element mounting device, in particular an axially extending rim region of at least one peripheral end that is curved at least in sections, in particular radially inwardly curved, and is configured to interact with the quick mounting device. The curved rim region is preferably a terminal rim region that includes an increased stiffness due to bending and in this way can transmit the fastening forces. At an end of the filter element which is facing away from the curved rim region, an alternative fastening element can be present, for example, at a separate housing cover that clamps the filter element in the interior.

In a preferred embodiment of the invention, in the region of the tongue the filter medium is in the form of a collecting pocket or catching pocket for particles wherein the catching pocket is downwardly closed so that particles cannot fall out of the catching pocket due to the force of gravity acting on them. The brake dust particle filter can retain large quantities of particles in this way. Advantageously, the filter medium can be imparted with the shape of the collecting or catching pocket already during manufacture so that the tongue maintains this shape with structural stiffness. Preferably, a lowest point of the pocket in the mounted arrangement is located so as to point downwardly in the direction of gravity.

In addition to the afore described tongue, the brake dust particle filter can comprise at least one additional tongue in the housing interior. In other words, the brake dust particle filter includes preferably a plurality of tongues that are projecting inwardly in the housing interior and are preferably spaced apart in peripheral direction. The tongues are each formed by the filter medium. Due to the arrangement or configuration of a plurality of tongues, the filter effect is further significantly increased. In this context, at least two tongues can assume a respective different angle relative to the housing peripheral wall. Angle relative to the housing peripheral wall is to be understood in this context as an angle between a tangent placed at a virtual contact point of the tongue at the housing peripheral wall and the length extension of the tongue.

The brake dust particle filter is preferably configured such that the filtering effect increases in the peripheral direction of the housing. In this context, the increase is realized preferably away from a contact region of the housing, wherein the contact region is provided for contacting the brake caliper of the disc brake assembly. In other words, the brake dust particle filter is preferably designed such that the filter effect increases with increasing distance from the brake caliper or from the contact region for contacting the brake caliper. A better filter effect is to be understood herein, for example, as the capability of separating finer particle fractions. This is realized in particular by one or a plurality of the following measures:

The porosity of the filter medium decreases in the peripheral direction of the housing. In particular, the filter medium includes a greater porosity at one tongue than the filter medium at the next neighboring tongue which is located farther away from the contact region of the brake dust particle filter.

The thickness of the filter medium increases in peripheral direction of the housing.

The tongue is positioned at a smaller angle relative to the housing peripheral wall than a neighboring tongue which is located farther away from the contact region.

A tongue projects with its free end less far into the interior of the housing than a neighboring tongue which is located farther away from the contact region of the brake dust particle filter.

The surface of a tongue is smaller than the surface of a neighboring tongue which is located farther away from the contact region of the brake dust particle filter.

The brake dust particle filter can comprise at least one opening for discharge of filtered air in the housing wall, in particular in the housing peripheral wall. Preferably, the brake dust particle filter includes a plurality of openings for discharge of filtered air in the housing wall, in particular in the housing peripheral wall.

At least one opening is preferably provided in a housing end region which, viewed in peripheral direction of the housing, is embodied in the region of the brake caliper. The housing end region engages across preferably at least one radially outwardly open region of the brake caliper because here typically a high brake dust discharge occurs that, in addition to the abraded particles of the brake which leave the brake caliper in tangential direction, constitutes the greatest emission source. Preferably, the filter medium is a continuous material strip which extends across the majority of the inwardly positioned tongues as well as across the inner side of the housing peripheral wall in the housing end region.

In order to prevent that air is forced by the dynamic pressure during driving through the filter medium against the filtration direction, at least one outwardly extending rib can be arranged or formed at the housing wall, in particular at the housing peripheral wall. Preferably, a plurality of outwardly projecting ribs is provided at the housing wall, in particular the housing peripheral wall. The at least one outwardly projecting rib can be provided preferably in the region of the at least one opening so that the rib at least partially covers the respective opening in the travel direction so that a dynamic pressure which is generated during traveling does not act on the opening. Preferably, a plurality of outwardly projecting ribs are provided in the region of an opening for discharge of filtered air, respectively, preferably each of the openings is provided with an afore described rib The filter medium is preferably configured such that it is stable even at a temperature of more than 600° C. in order to be able to withstand the temperatures in the immediate environment of the disc brake. The filter medium can comprise in this context a metal, a metal nonwoven, glass, ceramic and/or a high temperature-resistant plastic material, in particular polyether ether ketone. Preferably, the filter medium is a sintered metal nonwoven that is suitable for configuring a shape-stable filter element with integral tongues.

However, the housing also should be provided advantageously with a sufficient temperature resistance; for this purpose, it can be made from sheet metal, preferably sheet steel. Aside from the excellent temperature resistance, sheet steel has the further advantage that the housing can be obtained by a simple shaping process, for example, by deep drawing.

The ring segment-shaped housing covers preferably a large angle range of the brake disc in order to obtain a high filtration effect. The housing extends in this context preferably across a ring segment angle of more than 45°, in particular of more than 75°, particularly preferred of more than 90°. When selecting a suitable engagement angle, it is necessary to resolve conflicting goals between the proportion of particles to be filtered and the cooling effect to be made available to the disc brake.

For facilitating mounting of the housing, the housing can have a first and a second housing part. In this context, the two housing parts are preferably at least partially arrangeable axially on both sides of the brake disc. Particularly preferred, the first housing part and the second housing part are connectable in a reversibly detachable manner.

Alternatively, the two housing parts can also be connected so as to be non-detachable, for example, welded. Advantageously, according to this embodiment, the filter element is inserted already prior to connecting the housing parts so that at least the pre-assembly process is simplified even though the exchange of the filter medium for servicing is not. However, it is conceivable in this case in a service situation to exchange the entire brake dust filter (including housing and filter medium) in order to subject it to reprocessing, for example. As an alternative to a weld connection, it can be provided that the first housing part and the second housing part are connected to each other by means of a crimp connection.

For connecting the two housing parts, a screw connection, clip connection, a folding mechanism and/or a pivot mechanism can be provided.

The housing peripheral wall can be part of the first housing part or of the second housing part so that the latter is connected with one of the two housing side walls. Moreover, the housing peripheral wall can be embodied at least partially of overlapping housing parts.

A housing part can be pivoted relative to a stationarily remaining further housing part. The pivot axis of such a pivot mechanism can extend parallel to an axis connecting the two housing side walls, in particular parallel to the axis of rotation of the brake disc. In this case, it is particularly preferred that the housing part that includes the housing peripheral wall is pivotable at least partially relative to the further housing part. Alternatively or additionally, the pivot axis can extend in radial direction of the housing or in relation to the brake disc, i.e., normal to the axis of rotation of the brake disc. In this case, preferably a first housing side wall is pivotable relative to the further housing.

The afore described pivoting action significantly simplifies an exchange of the filter medium in the service situation.

The object according to the invention is furthermore solved by a disc brake assembly with a brake disc, a brake caliper, and a brake dust particle filter as described above.

The brake dust particle filter can comprise a stationary position relative to the brake caliper, to a wheel bearing housing and/or to a splash guard. Alternatively or additionally, the brake dust particle filter can be fastened at the brake caliper, at the wheel bearing housing, and/or at the splash guard, wherein an attachment at the brake caliper can be provided advantageously when a so-called fixed caliper is concerned. Particularly advantageously, the brake dust particle filter can be connected at the same fastening points to the wheel bearing housing as the brake caliper. Moreover, the screws with which the brake caliper is screwed to the wheel bearing housing can comprise a blind bore thread at least in the region of a screw head so that the brake dust particle filter is connectable to the screws so that advantageously the safety-critical screw connection of the brake caliper (holder) with the wheel bearing housing is not affected (settling/change of pretensioning force).

In a particularly preferred embodiment of the invention, a housing part of the brake dust particle filter can be a splash guard element, in particular a splash guard plate, that covers, positioned inwardly, the brake disc at least partially. In this way, an additional splash guard plate is not required so that weight can be saved which provides advantages in regard to driving dynamics due to an arrangement in the unsprung region of a vehicle chassis.

In order to effect a particularly effective particle separation, the brake dust particle filter is arranged preferably immediately adjoining the brake caliper. The brake dust particle filter is in this context preferably arranged downstream of the brake caliper wherein the term "downstream"

refers to the rotational direction of the brake disc in intended forward travel of the vehicle at which the disc brake assembly is provided.

The brake dust particle filter covers preferably at least partially an exterior side of the brake caliper, particularly preferred a peripheral outer side or radial outer side of the brake caliper. The coverage of the brake caliper is realized in this context preferably with the housing end region. Particularly preferred, in the region of the peripheral outer side where, in most cases, openings for cooling air supply and/or service (removal of the brake pads) are present, the brake caliper is completely covered, at least however in the region of the openings, by the housing end region of the brake dust particle filter so that no unfiltered outflow occurs in this region but instead particle-laden air exiting there first flows through the filter medium and finally through the opening in the housing peripheral wall into the environment.

In a further preferred embodiment of the disc brake assembly, the at least one inwardly projecting tongue is oriented with its free end toward the brake caliper. Preferably, a plurality, in particular all tongues with their respective free ends are oriented toward the brake caliper. In this way, the filter efficiency can be further increased because brake dust particles which are tangentially entrained by the rotation can be essentially caught by the shape of the tongues.

Further features and advantages of the invention result from the following description of a plurality of embodiments of the invention, from the claims as well as the Figures that show important details of the invention. The features disclosed in the Figures are illustrated such that the particularities according to the invention can be made clearly visible. The various features can be realized individually by themselves, respectively, or a plurality combined in any combinations in variants of the invention and are therefore combinable with each other.

DESCRIPTION OF PREFERRED EMBODIMENTS

Figure 1:
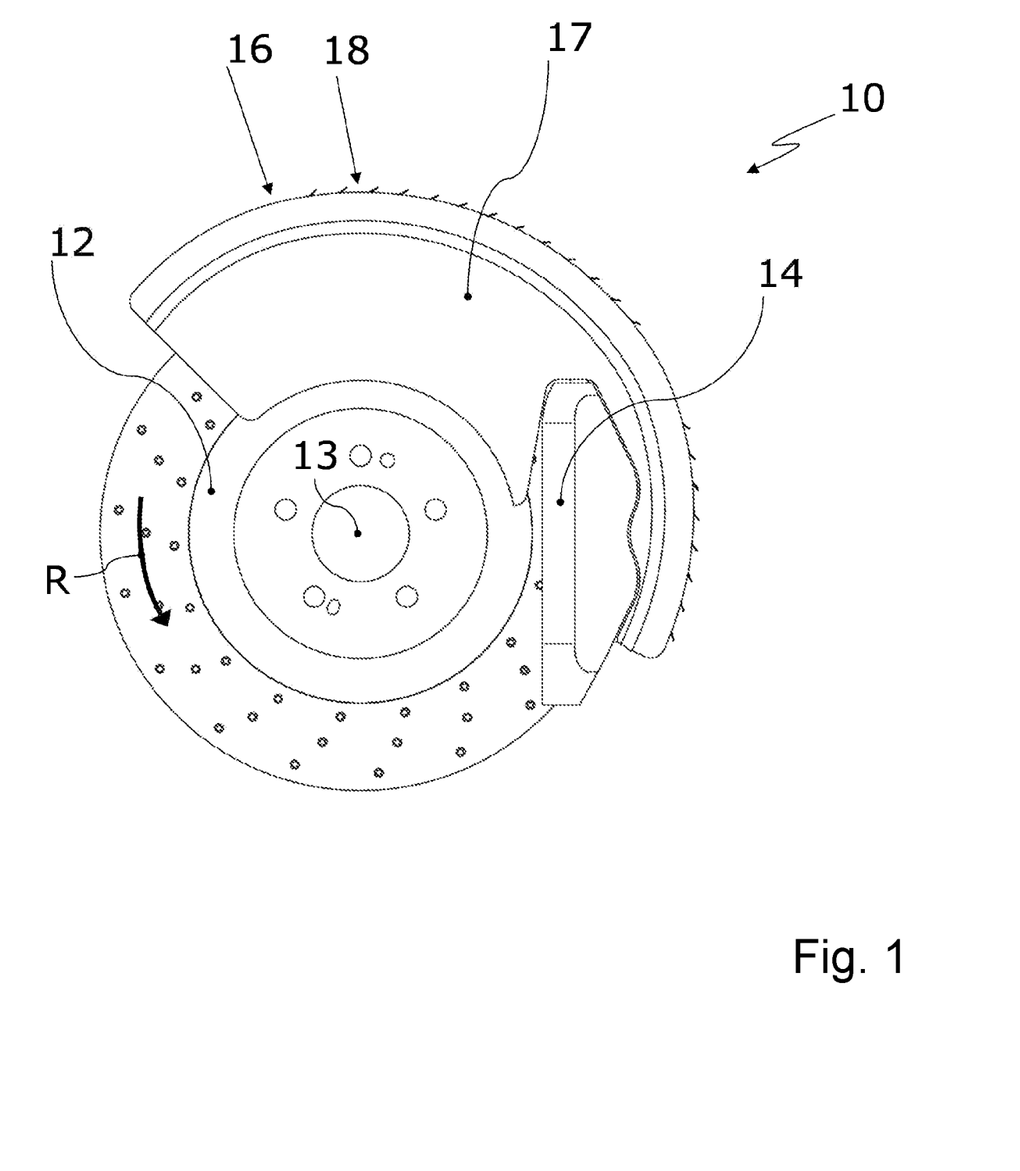
FIG. 1 shows a side view of a first embodiment of a disc brake assembly according to the invention with a brake dust particle filter.

FIG. 1 shows a side view of a disc brake assembly 10 with a brake disc 12 which includes an axis of rotation or rotational axis 13, with a brake caliper 14 and a brake dust particles 16 in a first embodiment. In this context, the brake dust particle filter 16 is arranged stationarily in its position relative to the brake caliper 14 and/or is fastened at the brake caliper 14. The disc brake assembly 10 includes moreover a wheel bearing housing (not shown) at which the brake caliper 14 is fastened, and the brake dust particle filter 16 can be arranged stationarily in its position relative to the wheel bearing housing and/or fastened at the wheel bearing housing. Alternatively or additionally, the disc brake assembly 10 can comprise a splash guard (not shown) in the form of a splash guard plate and the brake dust particle filter 16 can be arranged stationarily in its position relative to the splash guard and/or fastened at the splash guard.

The brake dust particle filter 16 includes a first housing side wall 17 which forms a part of a ring segment-shaped housing 18. A second housing side wall 19 (see FIG. 2) which also forms a part of the ring segment-shaped housing 18 is located axially spaced apart relative to the first housing side wall 17 along the axis of rotation 13 of the brake disc 12 and the brake disc 12 is accommodated between them in the housing interior.

The brake dust particle filter 16 can be arranged downstream of the brake caliper 14 in particular in rotational direction R of the brake disc 12 upon forward travel of the vehicle at which the disc brake assembly 10 is arranged.

Figure 2:
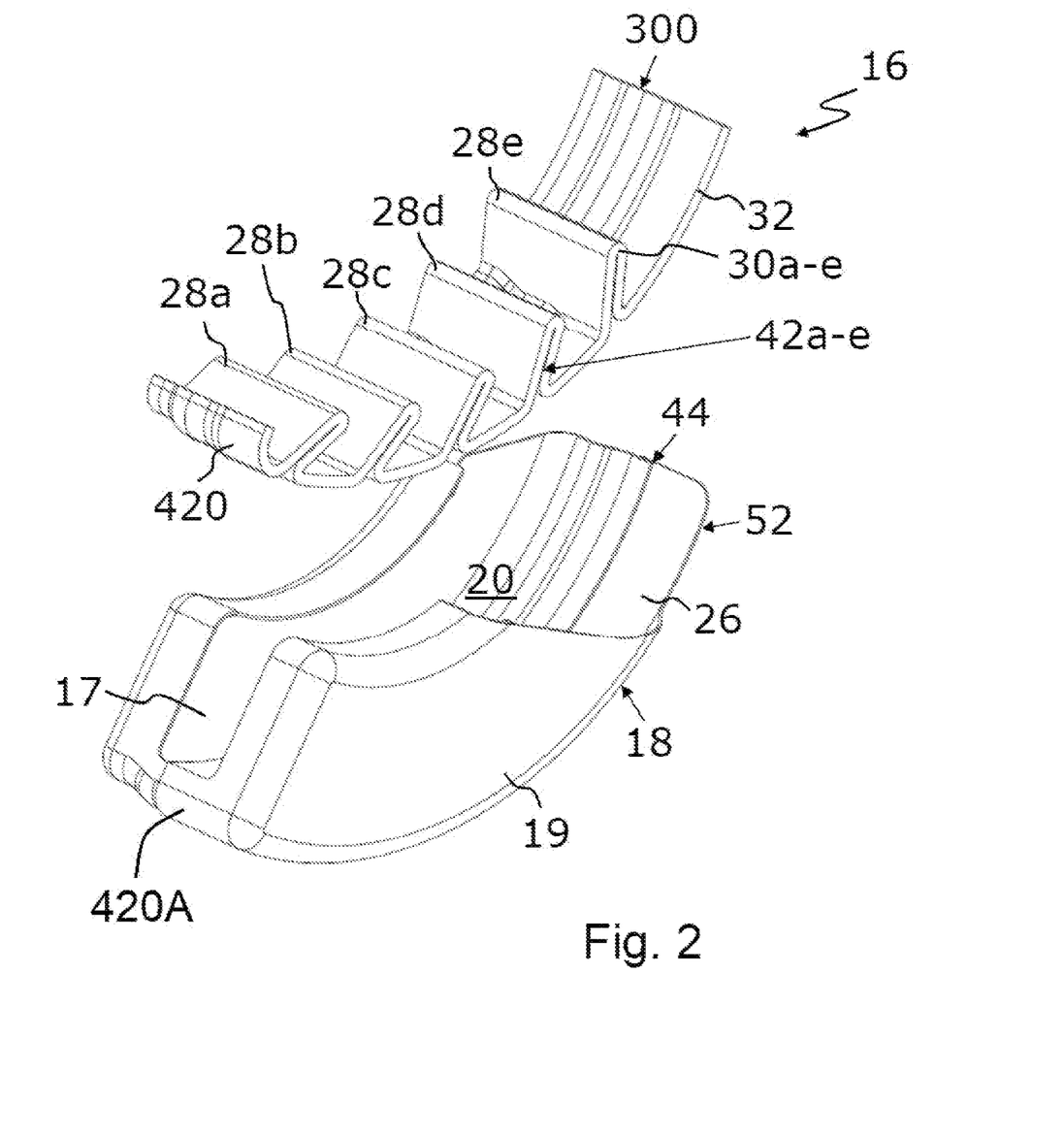
FIG. 2 shows an isometric view of a brake dust particle filter according to one embodiment.
Figure 3:
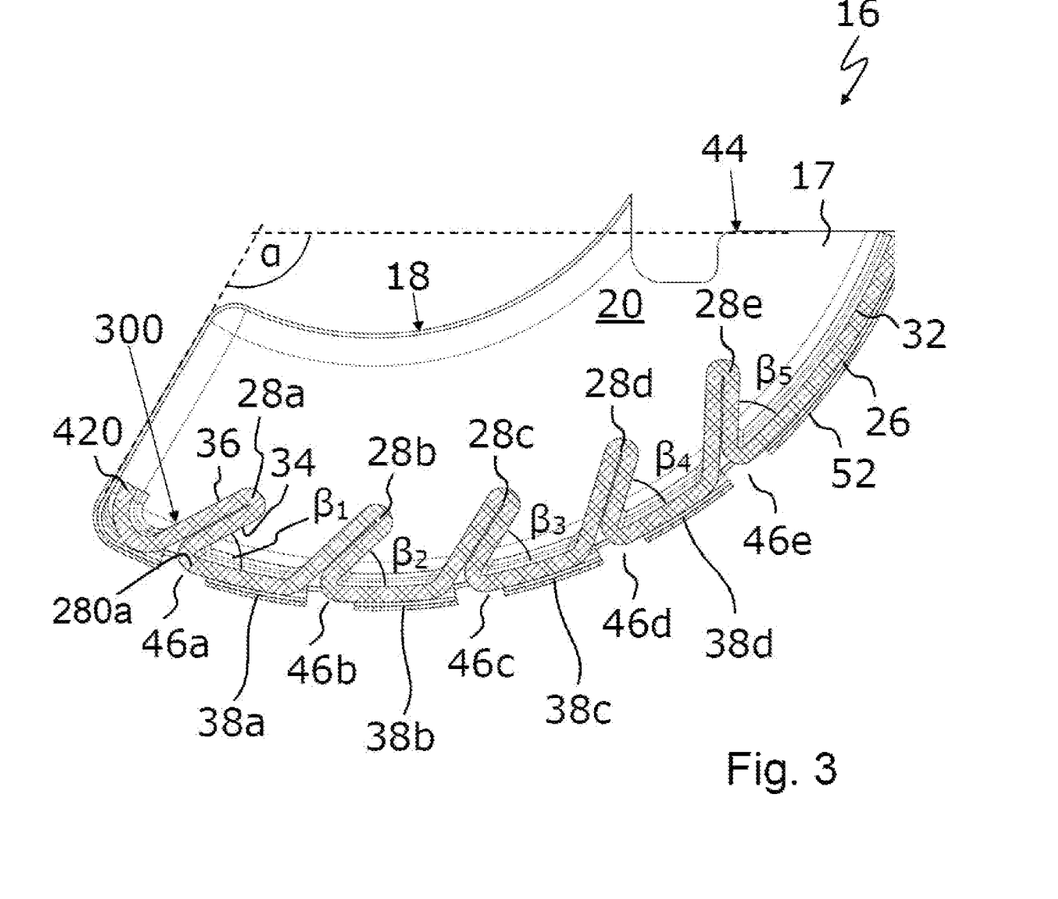
FIG. 3 shows a cross section view of the brake dust particle filter according to FIG. 2.

In FIG. 3, a cross section of the brake dust particle filter 16 for filtering air provided with brake dust is illustrated, in FIG. 2 the corresponding isometric view with partially radially outwardly moved filter element 300. Due to the ring segment-shaped housing 18, the brake dust particle filter 16 can accommodate the brake disc 12 (see FIG. 1) at least partially in the housing interior 20. The ring segment-shaped housing 18 can extend across a ring segment angle α of more than 90° in this embodiment. The brake dust particle filter 16 can be arranged flush at the brake caliper 14 (see FIG. 1) so that air moved by the brake disc 12 (see FIG. 1) when braking can flow from the brake caliper 14 into the brake dust particle filter 16.

The housing 18 includes a housing peripheral wall 26 extending radially outwardly in peripheral direction of the brake dust particle filter 16. The housing side walls 17 (see FIG. 1), 19 are connected to each other by means of housing peripheral wall 26.

The brake dust particle filter 16 includes moreover tongues 28*a*, 28*b*, 28*c*, 28*d*, 28*e*. These tongues 28*a* to 28*e* extend away from the housing peripheral wall 26 of the brake dust particle filter 16 and are formed of the filter medium 32, which can be seen particularly well in the illustration of FIG. 3. They project in the housing interior 20 of the brake dust particle filter 16 from the housing peripheral wall 26 inwardly. They are positioned in relation to the housing peripheral wall 26 at an angle $\beta_1$, $\beta_2$, $\beta_3$, $\beta_4$, $\beta_5$, respectively. At these tongues 28*a* to 28*e*, the air which flows into the brake dust particle filter 16 can be guided in the direction of the housing peripheral wall 26. The tongues 28*a* to 28*e* are oriented with their respective free ends 30*a*, 30*b*, 30*c*, 30*d*, 30*e* toward the brake caliper 14 (see FIG. 1).

The filter medium 32 forms the respective tongues 28*a* to 28*e* by a U-shaped or V-shaped folded structure 42*a*, 42*b*, 42*c*, 42*d*, 42*e* which extends inwardly with at least one radial component.

The filter medium is a continuous material strip which forms all tongues 28*a* to 28*e* and extends also across the inner side of the housing peripheral wall 26 into the housing end region 52.

In an exemplary fashion, the side facing the housing peripheral wall 26 is identified here at the tongue 28a by 34 and at the side facing away by 36. The effective filter surface is thus enlarged in peripheral direction of the housing interior 20 by the tongues 28a to 28e. The filter medium 32 is arranged moreover at sections 38a, 38b, 38c, 38d of the housing peripheral wall 26 between the tongues 28a to 28e. In this way, the filter medium 32 is connected immediately with the housing peripheral wall 26. In particular, it is attached to the housing peripheral wall 26. Alternatively, it can be connected also by further intermediate layers indirectly with the wall of the housing 18, in particular by means of a filter element support structure, for example, made of a metal screen. As shown in FIG. 3, the tongues (FIG. 3: 28a, 28b, 28c, 28d, 28e) project inwardly away from the housing peripheral wall 26 into the housing interior 20. The tongues project at least in sections with at least one radial component (FIG. 3: radial inwardly projecting sides 34, 35, project radially inward at angles $\beta_1$, $\beta_2$, $\beta_3$, $\beta_4$, $\beta_5$ relative to the housing peripheral wall 26). The tongues (FIG. 3: 28a, 28b, 28c, 28d, 28e) have a flat cross section shape (FIG. 3: flat sides 34, 36) and include: at least one base surface 280a facing the housing peripheral wall 26, an end face (pointed to be 28a in FIG. 3) projecting into the housing interior 20, and at least one side face (FIG. 3: 34, 36).)

The filter medium 32 with the tongues 28a to 28e integrally formed therewith is present according to this embodiment as a folded media section which includes the folds 42a to 42e, wherein the folded media section has a satisfactory inherent stiffness in order to be handled as filter element 300 and to be removed from/inserted in the housing 18 of the brake dust particle filter 16 for service purposes. At one of its end edges extending axially viewed in peripheral direction, the filter element 300 has a radially inwardly curved rim region 420 that is embodied to interact with a filter element mounting device 420A (see FIG. 2), which is present on the side of the housing 18. In this way, the filter element 300 with the curved rim region 420 can be clamped with form fit, for example, behind a fastening tab, i.e. filter element mounting device 420A.

In a further embodiment, the brake dust particle filter includes in addition to the filter medium 32 a further filter medium (not illustrated). In this context, the filter medium 32 is arranged between the respective tongue 28a to 28e and the further filter medium. The further filter medium includes a larger porosity than the first filter medium. In an alternative embodiment, the brake dust particle filter 16 can comprise additional filter media with different porosity.

The brake dust particle filter 16 can be designed such that the filter effect on the air, which is moved by the brake disc 12 in peripheral direction, increases. For this purpose, the porosity of the filter medium 32, beginning in a contact region 44 of the brake dust particle filter 16 provided for contacting the brake caliper 14 (see FIG. 1), can decrease in peripheral direction of the housing. Alternatively or additionally, the thickness of the filter medium 32, beginning at the contact region 44 of the brake dust particle filter 16 provided for contacting the brake caliper 14 (see FIG. 1) can increase in peripheral direction of the housing 18. Alternatively or additionally, a tongue 28a to 28e can be positioned at a smaller angle $\beta_1$, $\beta_2$, $\beta_3$, $\beta_4$, $\beta_5$ relative to the housing peripheral wall 26 than a neighboring tongue 28a to 28e which is located farther away from the aforementioned contact region 44. Alternatively or additionally, the free end 30a to 30e of a tongue 28a to 28e can project less far radially inwardly into the interior 20 of the housing 18 than a neighboring tongue 28a to 28e which is located farther removed from this contact region 44. Alternatively or additionally, the surface of at least one tongue 28a to 28e projecting into the housing interior 20 can be smaller than the surface of a neighboring tongue 28a to 28e projecting into the housing interior 20 which is farther removed from this contact region 44.

The brake dust particle filter 16 includes in its housing peripheral wall 26 openings 46a to 46e (see FIG. 3). The purified air can escape to the exterior through these openings 46a to 46e. The openings 46a to 46e are covered by the tongues 28a to 28e formed by the filter medium 32. In this way, it is ensured that only purified air can escape through the openings 46a, 46b to the exterior.

The brake dust particle filter 16 includes a housing end region 52. The housing end region 52 can comprise at least partially the housing side walls 17, 19 and the housing peripheral wall 26. Also, it includes the filter medium 32 which is arranged at the housing peripheral wall 26. The housing peripheral wall 26 extends into the housing end region 52. The housing end region 52 can be designed such that it covers in peripheral direction of the brake dust particle filter 16, beginning at the radially outer side of the brake dust particle filter 16, the brake caliper 14, in particular a gap 56 of the brake caliper 14 (see FIG. 6). The housing end region includes for this purpose a cutout that can be matched to the respective shape of the brake caliper, here a brake caliper with at least two pistons.

Figure 4:
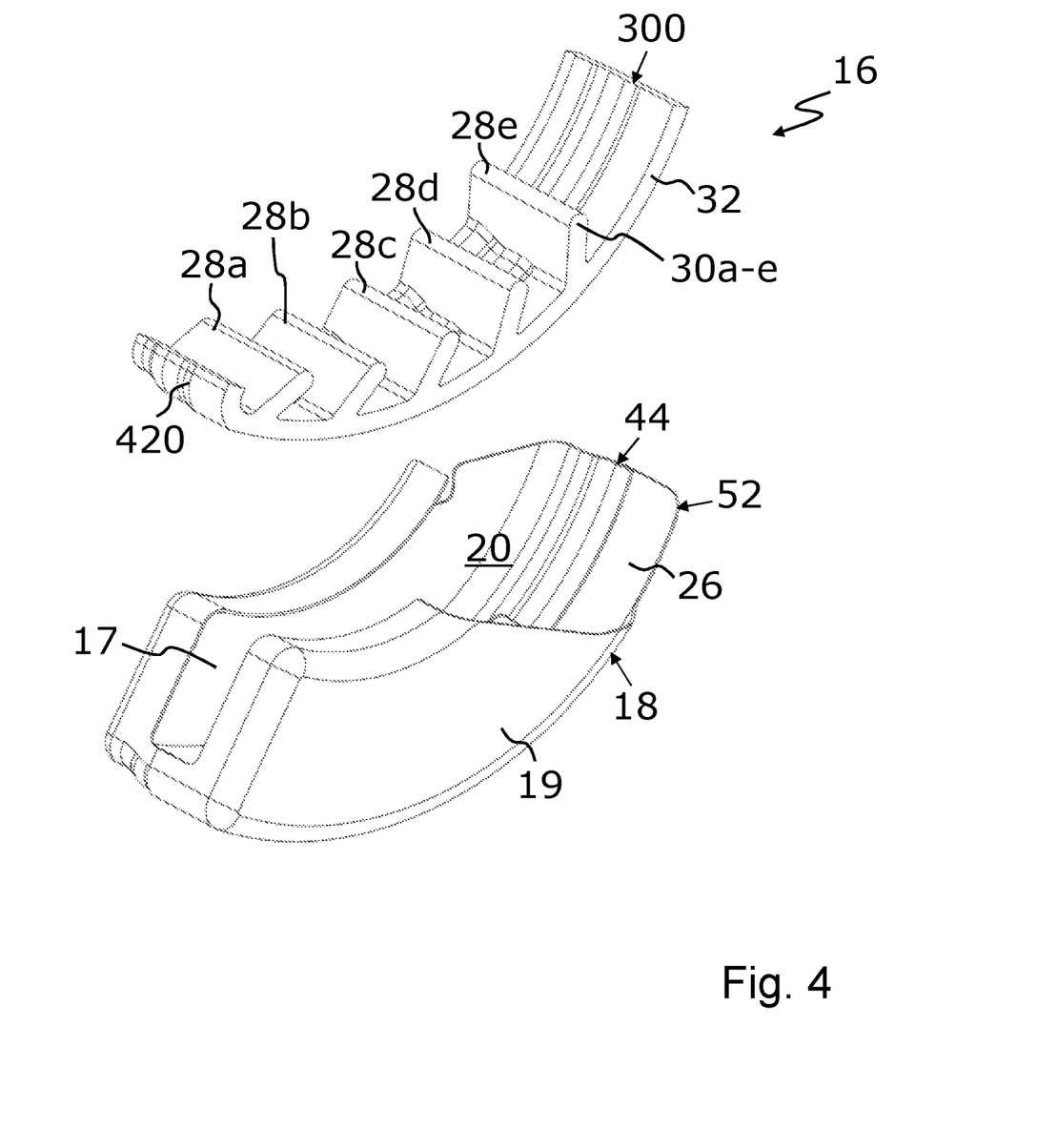
FIG. 4 shows an isometric view of a brake dust particle filter according to another embodiment.

According to the further embodiment of the brake dust particle filter 16 illustrated in FIG. 4, which corresponds substantially to the embodiment of FIGS. 2 and 3, the filter element 300 is not a folded filter element but a monolithic body of filter medium 32 which includes the tongues 28a to 28e, i.e., a shaped filter element. Such a shaped filter element 300 can be obtained, for example, by sintering, and provides the advantage, compared to a folded construction, that it tends to achieve greater stiffness. It can be in particular a sintered metal foam or a sintered metal nonwoven. Otherwise, the filter element 300 corresponds with regard to its geometry and function to the afore described.

Figure 5:
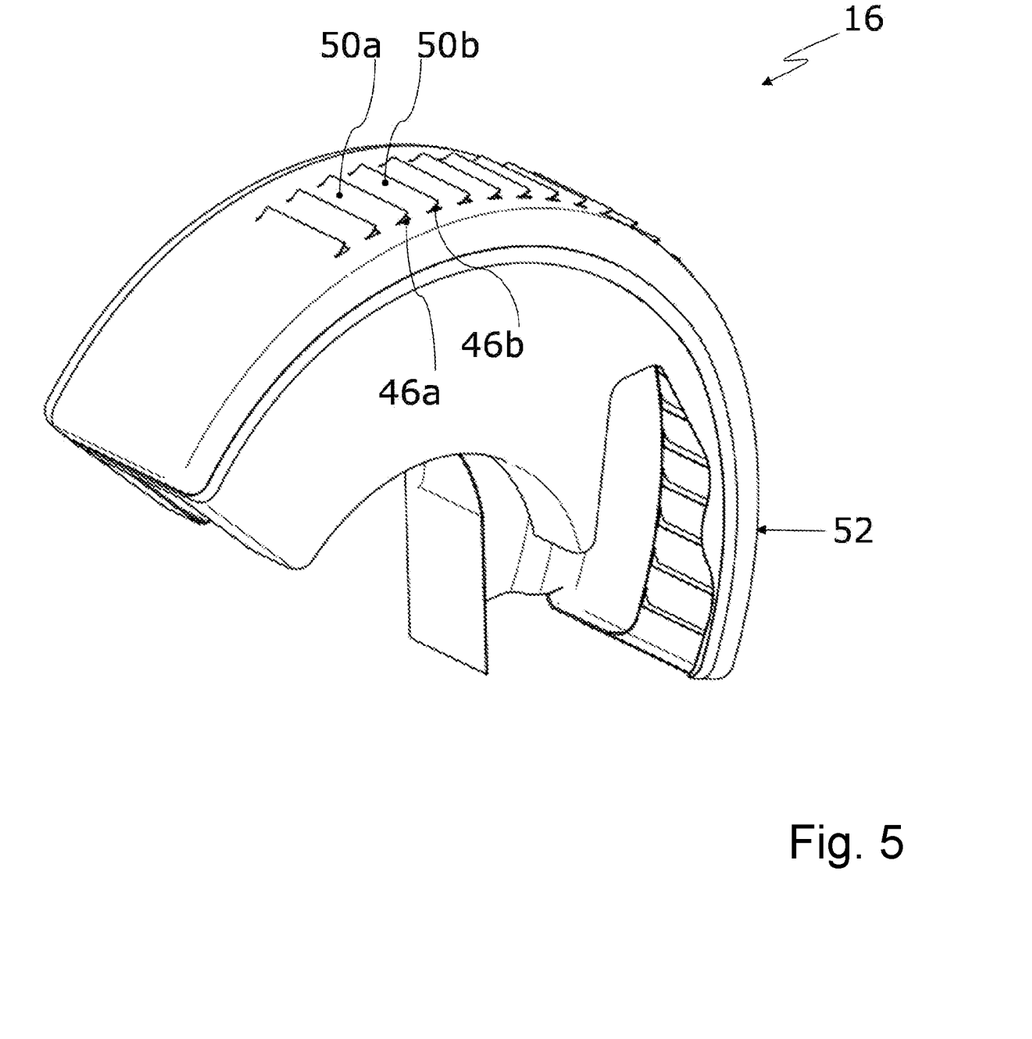
FIG. 5 shows an isometric view of the brake dust particle filter according to FIG. 1.

FIG. 5 shows an isometric view of the brake dust particle filter 16. In particular, the outwardly oriented ribs 50a, 50b as well as the openings 46a, 46b can be seen. The housing 18 can be embodied as one piece, i.e., one part.

Figure 6:
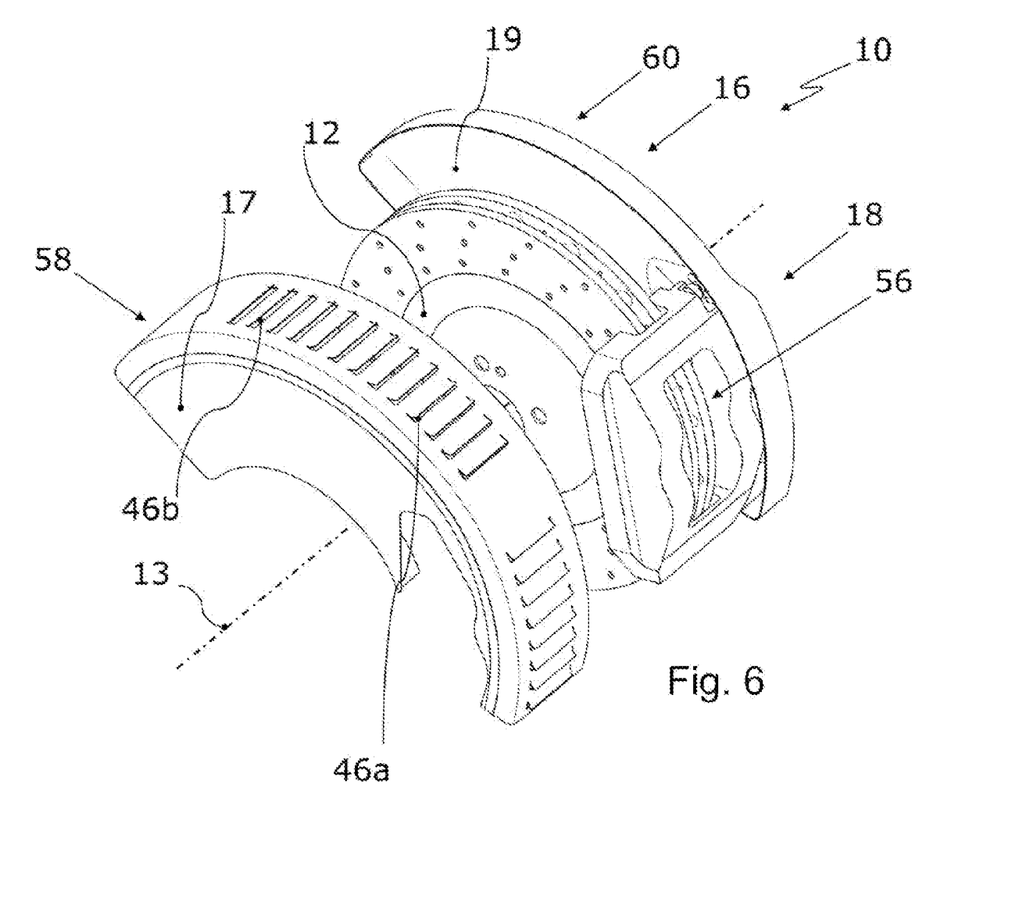
FIG. 6 shows an isometric view of a first housing part and a second housing part of the housing of a brake dust particle filter in a second embodiment of the disc brake assembly.

As is illustrated in FIG. 6, the housing 18 of the brake dust particle filter 16 in a second embodiment of the disc brake arrangement 10 can comprise a first housing part 58 and a second housing part 60. The first housing part 58 includes in this context the first housing side wall 17. The second housing part 60 includes the second housing side wall 19 which is axially displaced relative to the first housing side wall 17. Accordingly, the first housing side wall 17 can be arranged axially displaced along the axis of rotation 13 of the brake disc 12 relative to the brake disc 12 and the second housing side wall 19 arranged on the side of the brake disc 12 facing away from the first housing side wall 17. The first housing part 58 includes openings 46a, 46b. The second housing part 60, in particular the second housing side wall 19, can be embodied in the form of a splash guard plate so that, if in doubt, a separate splash guard plate of the brake disc is not needed which is in particular of interest in OE applications.

Figure 7:
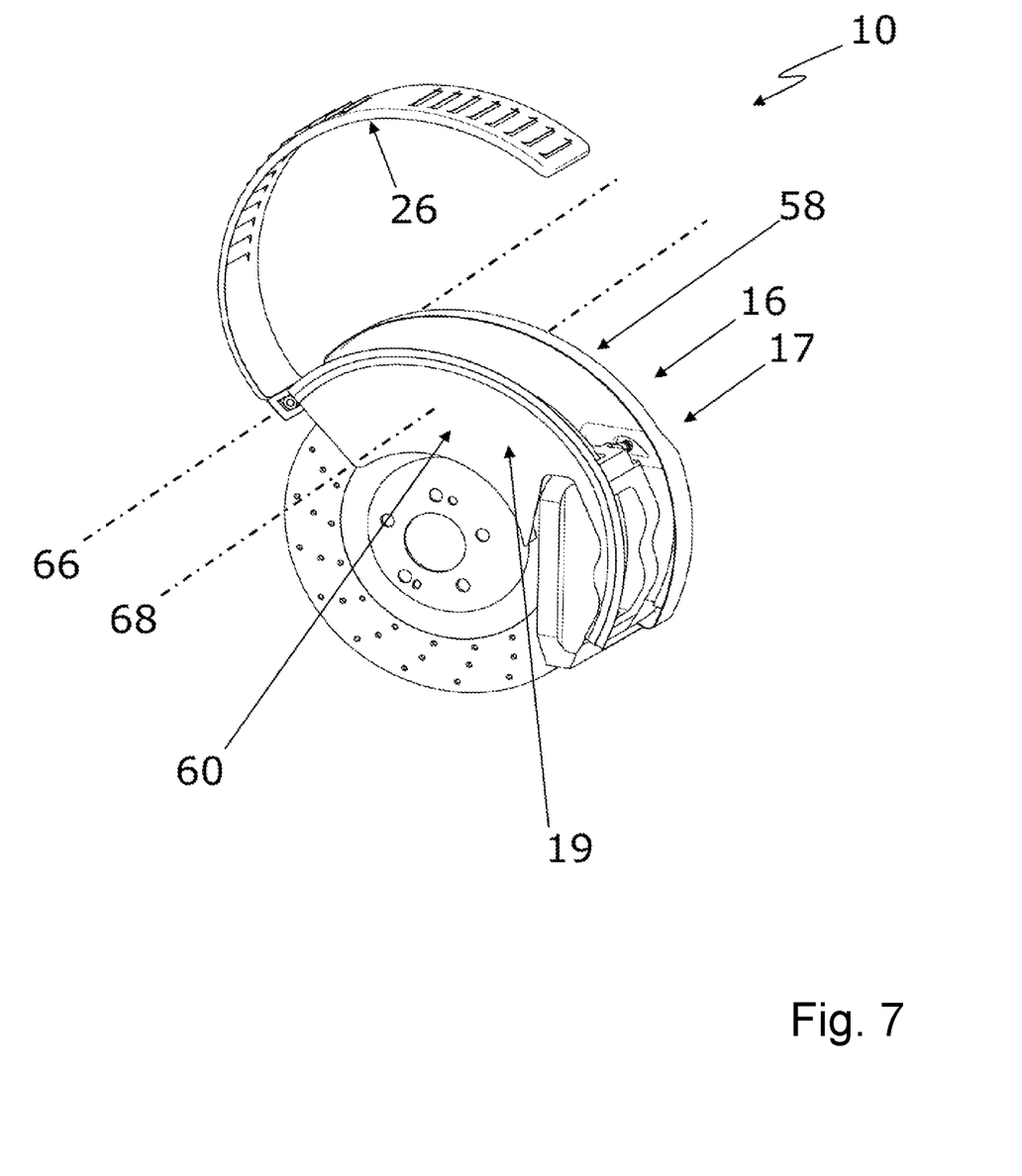
FIG. 7 shows an isometric view of the connection of a first housing part and of a second housing part of a third embodiment of the disc brake assembly by a pivot mechanism and/or a folding mechanism.

As shown in FIG. 7, in a third embodiment of the disc brake assembly 10 the first housing part 58 and the second housing part 60 can be connectable and/or connected to each other by a pivot mechanism and/or a folding mechanism in order to be able to quickly open and close the brake dust particle filter 16. The pivot axis 66 of the pivot mechanism can be arranged in this context parallel to an axis 68 which connects the two housing side walls 17, 19 or extends through them, which in this case additionally extends parallel to the axis of rotation of the brake disc. Then, the housing peripheral wall 26 can be pivoted relative to the two housing side walls 17, 19.

Figure 8:
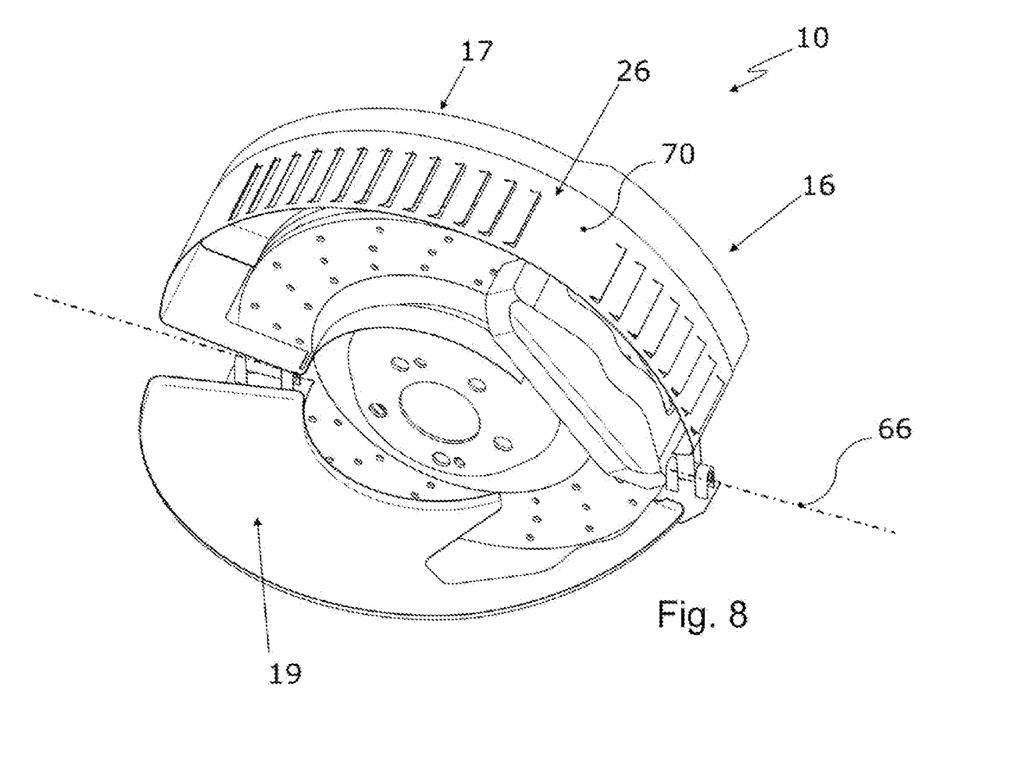
FIG. 8 shows an isometric view of the connection of the first housing part and of the second housing part by a pivot mechanism and/or a folding mechanism along a further pivot axis in a fourth embodiment of the disc brake assembly.

Alternatively or additionally, in a fourth embodiment of the disc brake assembly 10 the pivot axis 66 of the pivot mechanism can extend perpendicularly to the outer peripheral side 70 of the housing peripheral wall 26 of the brake dust particle filter 16 in the mounted state, as shown in FIG. 8. Then, the first housing side wall 17 can be pivoted relative to the second housing side wall 19 and the housing peripheral wall 26.

When looking jointly at all Figures of the drawing, the invention in summary includes a brake dust particle filter 16 for a disc brake assembly 10 with a brake disc 12 and a brake caliper 14. In the housing interior 20 of the housing 18 of the brake dust particle filter 16, at least one tongue 28a to 28e is arranged or embodied, wherein at least one section of this tongue 28a to 28e projects radially inwardly. The tongue 28a to 28e is formed by the filter medium 32 of the brake dust particle filter 16. The housing 18 includes the shape of a ring segment. It can be used at least for partial accommodation of the brake disc 12 in the housing interior 20. A first housing side wall 17 and a second housing side wall 19 as well as a housing peripheral wall 26 form parts of the housing 18, respectively. The housing side walls 17, 19 are spaced apart axially from each other. The housing peripheral wall 26 is arranged radially outwardly in peripheral direction of the housing 18. The housing peripheral wall 26 is arranged or embodied between the first housing side wall 17 and the second housing side wall 19. The brake dust particle filter 16 is embodied for catching particles that are generated during braking.

What is claimed is:

1. A brake dust particle filter for a disc brake assembly comprising a brake disc and a brake caliper, wherein the brake dust particle filter is configured to catch particles generated during braking; the brake dust particle filter comprising:
   a housing shaped as a ring segment and comprising two axially spaced apart housing side walls and a housing peripheral wall extending radially outwardly in relation to a central axis of the ring segment in a peripheral direction of the housing,
   wherein the housing peripheral wall is arranged between the housing side walls,
   wherein the housing is configured to accommodate at least partially the brake disc in a housing interior of the housing;
   a tongue projecting inwardly away from the housing peripheral wall into the housing interior,
     wherein the tongue projects at least in sections with at least one radial component,
     wherein the tongue has a flat cross section shape comprising:
       at least one base surface facing the housing peripheral wall,
       an end face projecting into the housing interior, and
       at least one side face;
   a filter medium,
     wherein the tongue is formed by the filter medium;
   wherein the tongue comprises
     no supporting device components separate from the filter medium, and
     the filter medium that forms the tongue is configured to maintain the flat cross section shape of the tongue during filter medium removal from or insertion into the housing;
   a filter element, wherein the filter element includes the filter medium;
     wherein the filter element further comprises a curved outer contour corresponding with an inner contour of the housing peripheral wall of the housing.

2. The brake dust particle filter according to claim 1, wherein
   the tongue has a substantially rectangular cross section,
   wherein a ratio of a wide side to a narrow side of the rectangular cross section lies between 15 and 60.

3. The brake dust particle filter according to claim 1, wherein
   the tongue extends away from one of the housing side walls.

4. The brake dust particle filter according to claim 1, wherein
   wherein the filter element further comprises
     a filter element support structure and the filter medium is fastened to the filter element support structure by an additional tongue which extends into the housing interior away from one of the housing side walls and engages with the housing,
   wherein the filter element is arranged in the housing.

5. The brake dust particle filter according to claim 4, wherein
   the filter element is exchangeably arranged in the housing such that the filter element can be removed from the housing and replaced with another filter element.

6. The brake dust particle filter according to claim 1, wherein
   an additional tongue is provided which extends into the housing interior away from one of the housing side walls,
   wherein the tongue extending away from the housing peripheral wall and the additional tongue extending away from said one housing side wall form a continuous tongue that has an L-shaped or U-shaped basic shape.

7. The brake dust particle filter according to claim 1, wherein
   the filter medium comprises a folded structure that forms the tongue,
   wherein a fold direction of the folded structure comprises a radial component.

8. The brake dust particle filter according to claim 1, further comprising
   at least a part of a filter element mounting device disposed at one of the two housing side walls or disposed at the housing peripheral wall.

9. The brake dust particle filter according to claim 8, wherein
   the filter element comprises
     at least one mounting counter element corresponding with the filter element mounting device.

10. The brake dust particle filter according to claim 9, wherein
    the at least one mounting counter element is an axially extending rim region that at least in sections is curved and is configured to interact with the filter element mounting device.

11. The brake dust particle filter according to claim 1, wherein the filter medium forms a catching pocket for particles in a region of the tongue,
wherein the catching pocket in a mounted state of the brake dust particle filter is downwardly closed in order to prevent the particles from escaping due to the force of gravity acting on the particles.

12. The brake dust particle filter according to claim 1, wherein
the brake dust particle filter comprises
a plurality of said tongue projecting inwardly in the housing interior and formed by the filter medium,
wherein the plurality of said tongue are arranged spaced apart from each other in the peripheral direction,
wherein the plurality of said tongue include a first tongue and a second tongue,
wherein the first tongue is positioned at a first angle relative to the housing peripheral wall and
the second tongue is positioned at a second angle relative to the housing peripheral wall, wherein the first angle is different from the second angle.

13. The brake dust particle filter according to claim 1, wherein
the brake dust particle filter is configured such that a filter effect on the air, moved by the brake disc in the peripheral direction of the housing, increases in that a porosity of the filter medium, beginning in a contact region of the brake dust particle filter configured to contact the brake caliper, decreases in the peripheral direction of the housing.

14. The brake dust particle filter according to claim 13, wherein
the brake dust particle filter comprises
a plurality of said tongue projecting inwardly in the housing interior and formed by the filter medium,
wherein the plurality of said tongue are arranged spaced apart from each other in the peripheral direction,
wherein the plurality of said tongue include a first tongue and a second tongue arranged next to the first tongue and located farther removed from the contact region of the brake dust particle filter configured to contact the brake caliper than the first tongue,
wherein the porosity of the filter medium is greater at the first tongue than at the second tongue.

15. The brake dust particle filter according to claim 1, wherein
the brake dust particle filter is configured such that the filter effect on the air, moved by the brake disc in the peripheral direction of the housing, increases in that a thickness of the filter medium, beginning at a contact region of the brake dust particle filter configured to contact the brake caliper, increases in the peripheral direction of the housing.

16. The brake dust particle filter according to claim 1, further comprising
a plurality of said tongue projecting inwardly in the housing interior and formed by the filter medium,
wherein the plurality of said tongue are arranged spaced apart from each other in the peripheral direction,
wherein the plurality of said tongue include
a first tongue and
a second tongue arranged next to the first tongue and located farther removed from a contact region of the brake dust particle filter configured to contact the brake caliper than the first tongue.

17. The brake dust particle filter according to claim 16, wherein
the brake dust particle filter is configured such that the filter effect on the air, moved by the brake disc in the peripheral direction of the housing, increases in that the first tongue is positioned at a first angle relative to the housing peripheral wall and the second tongue is positioned at a second angle relative to the housing peripheral wall, wherein the first angle is smaller than the second angle.

18. The brake dust particle filter according to claim 16, wherein
the brake dust particle filter is configured such that the filter effect on the air, moved by the brake disc in the peripheral direction of the housing, increases in that a free end of the first tongue projects less far radially inwardly into the interior of the housing than a free end of the second tongue.

19. The brake dust particle filter according to claim 16, wherein
the brake dust particle filter is configured such that the filter effect on the air, moved by the brake disc in the peripheral direction of the housing, increases in that the first tongue comprises a first surface projecting into the housing interior and the second tongue comprises a second surface projecting into the housing interior, wherein the first surface is smaller than the second surface.

20. The brake dust particle filter according to claim 1, further comprising
an opening configured to discharge filtered air and disposed in one of the two housing side walls or disposed in the housing peripheral wall.

21. The brake dust particle filter according to claim 20, wherein
the brake dust particle filter comprises a plurality of said opening configured to discharge filtered air,
wherein the plurality of said opening configured to discharge filtered air are disposed in the housing peripheral wall.

22. The brake dust particle filter according to claim 20, wherein
the housing comprises
a housing end region in the peripheral direction of the housing,
wherein the housing end region is configured to at least partially cover an outer circumference of the brake caliper,
wherein the opening for discharge of filtered air is arranged in the housing end region.

23. The brake dust particle filter according to claim 22, wherein
the brake dust particle filter comprises
a plurality of said opening configured to discharge filtered air and arranged in the housing end region.

24. The brake dust particle filter according to claim 1, further comprising
n outwardly projecting rib disposed at one of the two housing side walls or disposed in the housing peripheral wall.

25. The brake dust particle filter according to claim 24, wherein
the housing peripheral wall comprises
an opening,
wherein the outwardly projecting rib is arranged neighboring the opening in the housing peripheral wall and covers at least partially the opening in regard to a predetermined inflow direction of air.

26. The brake dust particle filter according to claim 24, wherein
the brake dust particle filter comprises
a plurality of said outwardly projecting rib arranged at the housing peripheral wall,
wherein the plurality of said outwardly projecting rib each are arranged neighboring a respective opening in the housing peripheral wall and covering at least partially the opening in regard to a predetermined inflow direction of air.

27. The brake dust particle filter according to claim 1, wherein
the housing extends across a ring segment angle of the ring segment of at least 45°.

28. A disc brake assembly comprising:
the brake disc;
the brake caliper; and
the brake dust particle filter according to claim 1.

* * * * *